(12) United States Patent
Hovgaard et al.

(10) Patent No.: US 10,767,628 B2
(45) Date of Patent: Sep. 8, 2020

(54) CONTROL OF A WIND TURBINE COMPRISING MULTI-AXIAL ACCELEROMETERS

(71) Applicant: Vestas Wind Systems A/S, Aarhus N. (DK)

(72) Inventors: Tobias Gybel Hovgaard, Ry (DK); Johnny Nielsen, Svenstrup J (DK); Peter Fogh Odgaard, Hinnerup (DK)

(73) Assignee: Vestas Wind Systems A/S, Aarhus N. (DK)

( * ) Notice: Subject to any disclaimer, the term of this patent is extended or adjusted under 35 U.S.C. 154(b) by 99 days.

(21) Appl. No.: 16/088,268

(22) PCT Filed: Apr. 4, 2017

(86) PCT No.: PCT/DK2017/050106
§ 371 (c)(1),
(2) Date: Sep. 25, 2018

(87) PCT Pub. No.: WO2017/174090
PCT Pub. Date: Oct. 12, 2017

(65) Prior Publication Data
US 2019/0085823 A1   Mar. 21, 2019

(30) Foreign Application Priority Data
Apr. 8, 2016  (DK) ................... 2016 70212

(51) Int. Cl.
*F03D 17/00* (2016.01)
*F03D 13/20* (2016.01)
(Continued)

(52) U.S. Cl.
CPC ......... *F03D 7/0224* (2013.01); *F03D 7/0272* (2013.01); *F03D 7/0296* (2013.01);
(Continued)

(58) Field of Classification Search
CPC . F03D 13/20; F03D 17/00; F03D 1/00; F03D 7/0224; F03D 7/0272;
(Continued)

(56) References Cited

U.S. PATENT DOCUMENTS

| 10,018,177 B2 * | 7/2018 | Fu .......................... F03D 7/045 |
| 2004/0108729 A1 * | 6/2004 | Wobben ................ F03D 7/0296 |
| | | 290/44 |

(Continued)

FOREIGN PATENT DOCUMENTS

| CN | 102767476 A | 11/2012 |
| CN | 103026057 A | 4/2013 |

(Continued)

OTHER PUBLICATIONS

European Patent Office, International Search Report and Written Opinion in PCT/DK2017/050106, dated Jul. 14, 2017.

(Continued)

*Primary Examiner* — Kidest Bahta
(74) *Attorney, Agent, or Firm* — Wood Herron & Evans LLP (57) ABSTRACT

The invention relates to control of a wind turbine comprising a plurality of multi-axial accelerometers mounted at different positions in the nacelle and/or in a top portion of the tower. The position and orientation of each accelerometer as mounted is obtained, accelerations in at least two different directions by each accelerometer are measured during operation of the wind turbine. From a number of predetermined mode shapes for the movement of the wind turbine is then determined an absolute position of at least one of the accelerometers during operation of the wind turbine based on the measured accelerations, the mount position and orientation of each accelerometer and the pre-determined mode shapes. Hereby a more precise absolute position (Continued)

during operation is obtained which can be used in the controlling of the turbine.

18 Claims, 4 Drawing Sheets

(51) Int. Cl.
    *F03D 7/02*     (2006.01)
    *F03D 7/04*     (2006.01)
    *G05B 17/02*     (2006.01)
    *F03D 1/00*     (2006.01)

(52) U.S. Cl.
    CPC ............. *F03D 7/04* (2013.01); *F03D 13/20* (2016.05); *F03D 17/00* (2016.05); *G05B 17/02* (2013.01); *F03D 1/00* (2013.01); *F05B 2220/30* (2013.01); *F05B 2240/221* (2013.01); *F05B 2240/30* (2013.01); *F05B 2240/912* (2013.01); *F05B 2260/71* (2013.01); *F05B 2260/74* (2013.01); *F05B 2260/80* (2013.01); *F05B 2260/821* (2013.01); *F05B 2260/96* (2013.01); *F05B 2270/1032* (2013.01); *F05B 2270/1033* (2013.01); *F05B 2270/20* (2013.01); *F05B 2270/304* (2013.01); *F05B 2270/334* (2013.01); *F05B 2270/335* (2013.01); *F05B 2270/402* (2013.01); *F05B 2270/807* (2013.01); *Y02E 10/723* (2013.01); *Y02E 10/728* (2013.01)

(58) Field of Classification Search
    CPC ....... F03D 7/0296; F03D 7/04; F05B 2220/30; F05B 2240/221; F05B 2240/30; F05B 2240/912; F05B 2260/71; F05B 2260/74; F05B 2260/80; F05B 2260/821; F05B 2260/96; F05B 2270/1032; F05B 2270/1033; F05B 2270/20; F05B 2270/304

See application file for complete search history.

(56) References Cited

U.S. PATENT DOCUMENTS

| | | | |
|---|---|---|---|
| 2006/0033338 A1 | 2/2006 | Wilson | |
| 2008/0118342 A1 | 5/2008 | Seidel et al. | |
| 2010/0140948 A1* | 6/2010 | Segovia | F03D 80/70 290/55 |
| 2011/0278852 A1* | 11/2011 | Hjort | F03D 80/00 290/55 |
| 2012/0027586 A1* | 2/2012 | Hoffmann | F03D 7/0224 416/1 |
| 2013/0272874 A1* | 10/2013 | Hess | F03D 7/0224 416/1 |
| 2018/0100488 A1* | 4/2018 | Miranda | F03D 7/047 |

FOREIGN PATENT DOCUMENTS

| | | |
|---|---|---|
| CN | 103410680 B | 1/2016 |
| CN | 105408625 A | 3/2016 |
| DE | 102012222191 A1 | 6/2014 |
| EP | 1719910 A1 | 11/2006 |
| EP | 2690286 A1 | 1/2014 |
| WO | 02075153 A1 | 9/2002 |
| WO | 2009010059 A2 | 1/2009 |
| WO | 2010060772 A2 | 6/2010 |

OTHER PUBLICATIONS

Danish Patent and Trademark Office, Examination Report in PA 2016 70212, dated Oct. 21, 2016.
China National Intellectual Property Administration, First Notification of Office Action in CN Application No. 201780035098.6, dated Sep. 25, 2019.

* cited by examiner

Fig. 8

CONTROL OF A WIND TURBINE COMPRISING MULTI-AXIAL ACCELEROMETERS

FIELD OF THE INVENTION

The present invention relates to control of a wind turbine based on information obtained from accelerometers.

BACKGROUND

Most modern wind turbines are controlled and regulated continuously with the purpose of ensuring maximum power extraction from the wind under the current wind and weather conditions, while at the same time ensuring that the loads on the different components of the wind turbine are at any time kept within acceptable limits.

During operation the wind turbine tower is seen to move and oscillate. Tower oscillations are caused primarily by variations in the thrust force and torque acting on the rotor. Such variations are typically caused by turbulence in the wind or by changes in the controlling of the wind turbine, for example changing pitch or yawing. For the control of the wind turbine and with the general purpose of optimizing the power production and reducing the loads of the turbine it is important to know or have a good estimate of the wind speed and the thrust force acting on the rotor. Likewise, the position and velocity of the nacelle or the tower top are important parameters to be able to take into account in the wind turbine control. Both the positions and the velocities in the fore-aft direction and in the side-side direction relative to the orientation of the wind turbine are of importance.

The tower oscillation may at least to some extent be determined by placing a number of accelerometers and/or strain gauges along the entire length of the tower in order to thereby estimate the mode shapes of the oscillating tower. In another approach, the top position may be estimated based on an accelerometer positioned to measure the fore-aft accelerations of the nacelle together with an estimate on the thrust force acting on the rotor. However, this approach takes only the fore-aft motion into account and the use of a thrust estimate in the estimation unavoidably decreases the accuracy of the method.

US 2008/118342 discloses placing accelerometers or strain gauges in the tower head and approximately halfway up the tower of an turbine corresponding to where the maximum deflections of the tower occur under its first and second natural frequencies. If the measurements exceed certain limits indicative of excessive oscillations, the turbine is operated in trundle mode to dampen the oscillations.

US 2004/108729 discloses a wind turbine with means for detecting and monitoring the oscillation of the wind turbine pylon. Two one-way accelerometers are placed at right angles in the nacelle and the measured accelerations are cumulated and used in determining the average deflection of the pylon from the rest position. However, the oscillation is only determined by this average over time which is far from fully describing the oscillation or the travel of the nacelle during operation.

WO2010060772 discloses to control an operational parameter of a wind turbine blade. The velocity of the wind turbine nacelle and a position of the wind turbine nacelle relative to a running mean are determined and from these the actual operating situation. This actual operating situation is compared to a predetermined space of acceptable operating situations determined from a set of normal operating situations, and a control strategy is chosen from a predetermined set of strategies.

SUMMARY OF THE INVENTION

An object of embodiments of the invention is to provide a more precise and robust yet effective method to determine the tower oscillations and for improving the determination of the tower top position and velocities both during fore-aft and side-side motions of the tower.

A further object of embodiments of the invention is to provide a method of improving the determination of the thrust forces acting on the rotor, which method is equally well suited during any type of rotor operation as well as during stand-still.

In a first aspect the present invention relates to a method of controlling a wind turbine, the wind turbine comprising a tower supporting a nacelle and a rotor with a number of pitch-adjustable rotor blades, the wind turbine further comprising a control system for changing the pitch of the rotor blades and/or the generator torque, and a plurality of multi-axial accelerometers mounted at different positions in the nacelle and/or in a top portion of the tower, each accelerometer being mounted in a defined orientation. The method comprises:

obtaining the position and orientation of each accelerometer as mounted;

measuring accelerations in at least two different directions by each accelerometer during operation of the wind turbine;

obtaining a number of pre-determined mode shapes for the movement of the wind turbine based at least on dimensions of the tower and a weight of the nacelle and the rotor as supported by the tower;

determining an absolute position of at least one of the accelerometers during operation of the wind turbine based on the measured accelerations, the mount position and orientation of each accelerometer and the pre-determined mode shapes;

determining a control parameter of the wind turbine as a function of the determined absolute position; and controlling the wind turbine according to the control parameter.

Hereby is obtained a simple yet effective control method wherein the tower top positions can be effectively determined and with improved accuracy thereby improving the control method with the possibility to better control and dampen the tower oscillations and thereby the loads.

By the proposed method measuring accelerations in at least two different directions by each multi-axial accelerometer during the operation of the wind turbine, the accelerometers will measure components of both the actual accelerations from the tower top movements as well as from the gravity. This information together with the mode shapes of the movement of the wind turbine is then effectively used in setting up equations for determining the tower top absolute positions.

Because of the use and positioning of a plurality of multi-axial accelerometers, both fore-aft and side-side movements of the wind turbine can be taken into considerations yielding a far more precise estimate for the absolute position during the wind turbine operation.

By the proposed method, the control method is based on the determined absolute position of one or more of the accelerometers and not only a relative position, average deflection or amplitude as seen in the prior art. Hereby the control parameter of the wind turbine can be determined far more accurately yielding a more precise and effective control method.

The measurements from the plurality of multi-axial accelerometers comprise components of both the actual accelerations from the tower top movements as well as from the gravity, decomposed in the multiple axes of the accelerometers. By estimating the tower to vibrate and oscillate according to the number of pre-determined mode shapes, equations can be set up relating the tower top position(s) to the absolute position of each of the accelerometers and again to the measured accelerations.

According to the invention, a plurality of multi-axial accelerometers is mounted at different positions in the nacelle and/or in a top portion of the tower. The plurality of accelerometers may be two, three or more accelerometers, and these are each configured for measuring accelerations in two or more directions, typically in three directions. One, more, or all of the multi-axial accelerometers may measure accelerations in three directions orthogonal to each other. The more accelerometers used, the lower the noise and the more accurate the absolute positions can be determined.

The accelerometers are mounted at different positions. The positions are obtained and used in determining the absolute position according to the method. The position of an accelerometer as mounted typically corresponds to the position during a standstill of the wind turbine where the wind turbine is not oscillating or only oscillating insignificantly (as compared to oscillations during operation of the wind turbine).

The accelerometers are mounted at different positions in the nacelle and/or at in a top portion of the tower, such as inside the nacelle, in or near the hub, near the yawing system, and/or in the uppermost part of the tower, such as in the uppermost 0-10 meters of the tower. Hereby is obtained an absolute position of a point in the nacelle or a top portion of the tower which is the most advantageous for the controlling according to the method as the determined position then yields a reliable measure of the position of the nacelle and thereby of the rotor hub during any deformation or oscillation of the wind turbine.

The accelerometers are mounted at different positions to obtain information of the accelerations experienced at these different and multiple positions. The accelerometers are mounted in defined orientations, i.e. well-known orientations which may be partially or completely the same, or all different. Preferably, all or at least some of the accelerometers are mounted such as to measure accelerations in two predominantly horizontal or near horizontal directions. As the wind turbine tower bends and oscillates these directions naturally change with the deformation and movement.

The pre-determined mode shapes for the movement of the wind turbine are based at least on dimensions of the tower. The dimensions preferably include the most significant and structurally describing dimensions of the tower such as the height (i.e. the overall length) of the tower from the ground to its top and optionally the positions of any supporting guy-wires or the like. The dimensions may further include the diameter of the tower, or diameters and lengths of tower sections depending on the structural design of the tower. The dimensions may include the tower thickness and/or tower wall stiffness.

The pre-determined mode shapes for the movement of the wind turbine are further based at least on a weight of the nacelle and the rotor as supported by the tower. The weight preferably includes the weight of all components inside or on the nacelle as supported by and carried by the tower and as positioned near or at the upper end of the tower.

The mode shapes for the movement of the wind turbine characterize the modal dynamics and the normal modes of the wind turbine i.e. how the wind turbine tower including the nacelle and rotor as supported by the tower sway back and forth and in sideway motions at its natural frequencies or resonant frequencies. The mode shapes may include the first and preferably at least the second mode shapes in the fore-aft direction. For a more precise determination of the absolute position, the mode shapes may further include the first and preferably at least also the second mode shapes in the side-side direction. The mode shapes may further include mode shapes of higher order for the motion of the tower in one or both directions of the fore-aft and/or side-side directions. The mode shapes may further include mode shapes of the rotor blades both rotating and non-rotating. The mode shapes may be pre-determined for example from finite-element analyses or other structural and dynamical models.

The tower dimensions and the weight of the nacelle and the rotor as supported by the tower are the main and dominant parameters in the determination of the mode shapes and by the use of these parameters effective and fairly accurate estimates for the mode shapes can be determined. The more information and details on the wind turbine structure and design, the more accurate mode shapes may be obtained.

The control method determines an absolute position of at least one of the accelerometers during operation of the wind turbine. The operation may include any type of operation of the wind turbine such as normal energy-producing operation, idle rotation of the rotor, operation during start-up and shutdowns, stand-still and/or breaking operations. The absolute position of the at least one accelerometer expresses the position relative to some fixed coordinate system and thereby over time expresses the movement of the accelerometer and thereby the movement and oscillation of the wind turbine.

The control method may be implemented on new or existing wind turbines as pure software implementation with no need for any additional hardware on the turbine except for the plurality of multi-axial accelerometers, or may be implemented as a combination of software and hardware.

In an embodiment of the invention, the control method further comprises determining a velocity of at least one of the accelerometers during operation of the wind turbine based on the measured accelerations, the position and orientation of each accelerometer as mounted, and the mode shapes. Hereby is obtained a more precise and accurate estimate for the tower oscillation whereby the control parameters can be more precisely determined to dampen the tower oscillations and thereby the tower loads. Further, the velocity may be used together with the determined positions and measured accelerations to determine the thrust acting on the wind turbine rotor during the operation.

In an embodiment, the number of pre-determined mode shapes of the wind turbine is determined from the natural mode shapes of a beam fixed in one end and with a point mass at an opposite free end. Hereby is obtained a set of mode shapes which to a high degree characterize the mode shapes of a physical land-based wind turbine. Further, the mode shapes hereby can be determined effectively and by relatively simple means. The length of the beam should preferably correspond to the length or height of the tower and the point mass correspond to the weight of the nacelle and the rotor as supported by the tower. The mode shapes can be refined by including more details into the beam model such as a more specific mass and/or stiffness distribution along the length of the beam (corresponding to the wind turbine tower) and for example by taking into account the rotating rotor as well. The mode shapes hereby models the dynamical behaviour of the wind turbine. For off-shore or differently supported wind turbines, the pre-determined mode shapes of the wind turbine can be determined from a beam model with correspondingly changed end conditions.

In an embodiment of the invention, the number of pre-determined mode shapes comprises at least the two first natural mode shapes in a plane corresponding to fore-aft movements of the wind turbine. This is advantageous as these mode shapes and in particular the first mode shape are dominating the movements of the wind turbine driven by the variations of the thrust force.

In an embodiment of the invention, the number of mode shapes comprises at least the two first natural mode shapes in a plane corresponding to side-side movements of the wind turbine. This is advantageous as these mode shapes and in particular the second side-side mode shape are dominating the movements of the wind turbine driven by the generator torque.

The accuracy of the position estimation improves as more mode shapes are included in the estimation.

Preferably, both mode shapes for the fore-aft motion and the side-side motion are included in the estimation thereby improving the estimate and determination of the absolute position. Preferably, the governing equations for the wind turbine motion are formulated taking into account the fore-aft and side-side movements as coupled movements.

In a further embodiment, the control method further comprises estimating a thrust force acting on the rotor blades by the wind based on the determined absolute position of the at least one of the accelerometers during operation of the wind turbine. Hereby is obtained an improved measure for the thrust force and thereby of the loads acting on the rotor and the different wind turbine components than otherwise typically estimated. Traditionally the tower oscillations are obtained based on estimations of the thrust force. Naturally, basing such estimations on another estimate (on the thrust force) only adds to the uncertainty of the method. However, here the thrust force can be determined far more accurately as it can be derived directly from the determined tower oscillations.

In yet an embodiment, the control method further comprises estimating a wind speed based on the estimated thrust and parameters including a rotational speed of the rotor blades, a pitch angle of each of the rotor blades, and an air density. Hereby is by simple means and few additional steps obtained an estimate of the wind speed which at least in some situations may prove more accurate than measured wind speeds (where e.g. the rotor operation in some cases has been seen to affect the measurements by the wind speed sensors) or wind speeds estimated by other methods (such as from the power). Hereby the current wind speed may be ascertained with greater certainty either directly from estimated wind speed by this method according to the invention alone, or by comparisons of the estimated and measured wind speed by different methods and/or sensors In an embodiment of the invention the absolute position of the accelerometer(s) is determined by means of a Kalman filter. Kalman filtering, also known as linear quadratic estimation (LQE), is an algorithm that uses a series of measurements observed over time, containing statistical noise and other inaccuracies, and produces estimates of unknown variables (here the absolute position) that tend to be more precise than those based on a single measurement alone. The Kalman filtering may comprise a frequency-weighted Kalman filter, and/or a non-linear filter such as an extended Kalman filter or an unscented Kalman filter, and/or other types of Kalman filtering techniques. Hereby, both the fore-aft and side-side position of the at least one accelerometer as well as its velocities can be determined by first in a prediction step producing estimates of the current state variables (accelerometer position and velocity), along with their uncertainties, and then from the outcome of the next measurement (of accelerations) updating these estimates using a weighted average.

According to yet another embodiment of the invention, the multi-axial accelerometers are each mounted with two axes of measurement arranged in an essentially horizontal plane. Hereby is obtained that accelerations are measured at least in two horizontal directions when mounted even if the accelerometers are only bi-axial accelerometers. Hereby, information on the accelerations in both the fore-aft and in the side-side directions can be obtained at all times for all deformations and movements of the tower top.

In an embodiment, at least two of the plurality of the multi-axial accelerometers are mounted such that the axes of measurement of the multi-axial accelerometers are oriented in the same directions. Hereby, the accelerations in these common directions can be readily obtained without the need to first convert the measured accelerations from one reference system to another. Further, the measured accelerations from these common directions may then readily be converted into some other reference system if desired by means of the same operations.

In an embodiment of the invention, at least two of the plurality of the multi-axial accelerometers are mounted such that the axes of measurement of the multi-axial accelerometers are oriented differently. Hereby, the accelerometers can be mounted faster and more easily in that they need not be oriented the same. The measured accelerations can then be converted in to common reference system by use of the information of how each accelerometer is mounted.

In an embodiment, a first accelerometer is mounted at a first position in a first vertical plane parallel to an axis of rotation of the rotor blades of the wind turbine, and a second accelerometer is mounted at a second position in a second vertical plane parallel to the axis of rotation, the first plane being different from the second plane. Hereby is ensured that at least two of the plurality of accelerometers are mounted with some horizontal distance when seen from an end of the nacelle. Hereby the accelerometers better capture and show any sideways tilting of the nacelle and/or top portion of the tower. This can be seen more clearly from the illustration of FIG. 2, described in more detail later.

In a further embodiment a first accelerometer is mounted at a first position at a first plane perpendicular to an axis of rotation of the rotor blades of the wind turbine, and a second accelerometer is mounted at a second position in a second plane perpendicular to the axis of rotation, the first plane being different from the second plane. Hereby is ensured that at least two of the plurality of accelerometers are preferably not placed one directly above the other. Hereby the accelerometers better capture and show both any sideways tilting and/or any fore-aft tilting or movement of the nacelle and/or top portion of the tower. This can be seen more clearly from the illustration of FIGS. 1 and 2, both described in more detail later.

The control parameter may preferably comprise a pitch parameter of one or more of the rotor blades and the controlling of the wind turbine then comprises pitching one or more of the blades according to the pitch parameter.

Hereby the pitch parameter(s) of the turbine is based on more accurate data including information on the tower top motion and oscillation improving the control of the wind turbine.

The control parameter may alternatively or additionally comprise other control parameters, such as a torque parameter, possible in the form of a power setpoint, and the controlling of the wind turbine comprises adjusting the torque of a wind turbine generator according to the torque parameter/power setpoint. The advantages hereof are the same as for the control parameter comprising a pitch parameter as described above.

In a further aspect the present invention relates to a control system for a wind turbine comprising a tower supporting a nacelle and a rotor with a number of pitch-adjustable rotor blades, the wind turbine further comprising a plurality of multi-axial accelerometers mounted at different positions in the nacelle and/or in a top portion of the tower, each accelerometer being mounted in a defined orientation, and the control system being configured to perform the steps of:

- obtaining the position and orientation of each of a plurality of multi-axial accelerometers as mounted;
- receiving data of the acceleration in at least two different directions as measured by each of the accelerometers during operation of the wind turbine;
- obtaining a number of pre-determined mode shapes for the movement of the wind turbine based at least on dimensions of the tower and a weight of the nacelle and rotor as supported by the tower;
- determining an absolute position of at least one of the accelerometers during operation of the wind turbine based on the measured accelerations, the mount position and orientation of each accelerometer and the pre-determined mode shapes;
- determining a control parameter of the wind turbine as a function of the determined absolute position; and
- controlling the wind turbine according to the control parameter.

In a further aspect the present invention relates to a wind turbine comprising a tower supporting a nacelle and a rotor with a number of pitch-adjustable rotor blades, the wind turbine further comprising a plurality of multi-axial accelerometers mounted at different positions in the nacelle and/or in a top portion of the tower, each accelerometer being mounted in a defined orientation, and a control system according to the above.

In a further aspect the present invention relates to a computer program configured when executed for controlling a processor to perform the method according to any of the previously described embodiments.

The advantages of the control system, the wind turbine comprising such control system, and the computer program configured for performing the control method are as described in relation to the control method in the previous.

BRIEF DESCRIPTION OF THE DRAWINGS

In the following different embodiments of the invention will be described with reference to the drawings, wherein.

DESCRIPTION OF EMBODIMENTS

Figure 1:
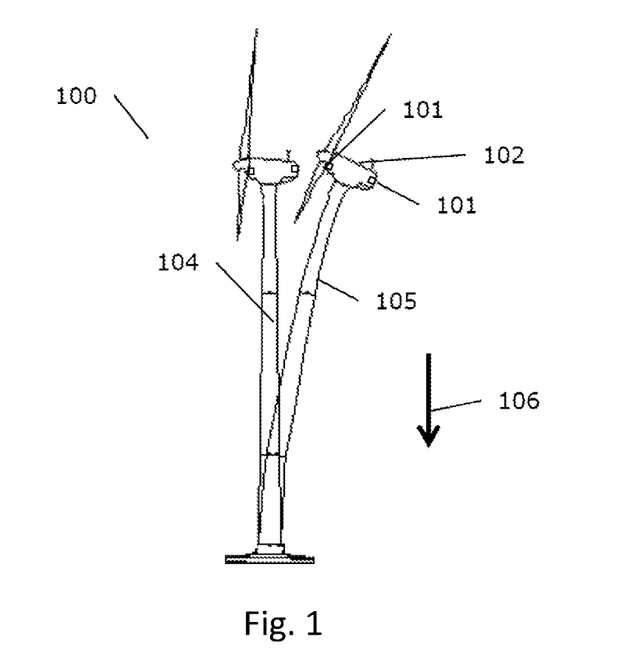
FIG. 1 shows a wind turbine equipped with a plurality of multi-axial accelerometers and during a fore-aft movement.
Figure 2:
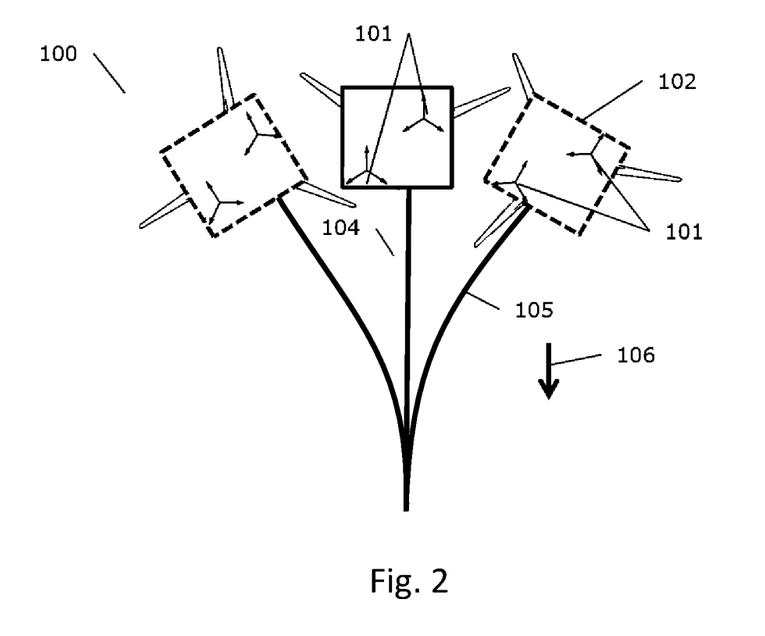
FIG. 2 shows a wind turbine equipped with a plurality of multi-axial accelerometers and during a side-side movement.

FIGS. 1 and 2 illustrate a wind turbine 100 equipped with a plurality of multi-axial accelerometers 101. Here two three-axial accelerometers 101 are mounted at different positions in the nacelle 102. The multi-axial accelerometers are indicated by their measuring axes and how these are oriented when the wind turbine 100 is in its un-deformed and upright position 104 and as oscillating 105 (the movements and deformation of the wind turbine are exaggerated for clarity). The accelerometers 101 measure components of both the actual accelerations from the tower top movements as well as from the gravity (illustrated with the arrow 106), decomposed in the three axes depending on the pose of the accelerometer. Pose of each accelerometer is a combination of the a priori known geometry of the installation in the nacelle/hub (i.e. the position and orientation of the accelerometer as mounted) and how the accelerometer is moved (translation, rotation, yawing) due to the tower top movement. This is illustrated for movements and oscillations in the fore-aft direction, with two accelerometers depicted as three-axis coordinate systems, in FIG. 1, and for movements and oscillations in the side-side direction (seen from the back of the nacelle) in FIG. 2. In FIG. 2, the nacelle 102 is simply indicated by a box. For better capturing the movement of the wind turbine, the accelerometers are mounted at different positions and preferably not directly above each other, preferably one behind the other, and preferably at different sideways positions (when seen as in FIG. 2 from the back of the nacelle). Hereby the components from the gravity in the measured acceleration signals are different on each accelerometer.

Figure 3:
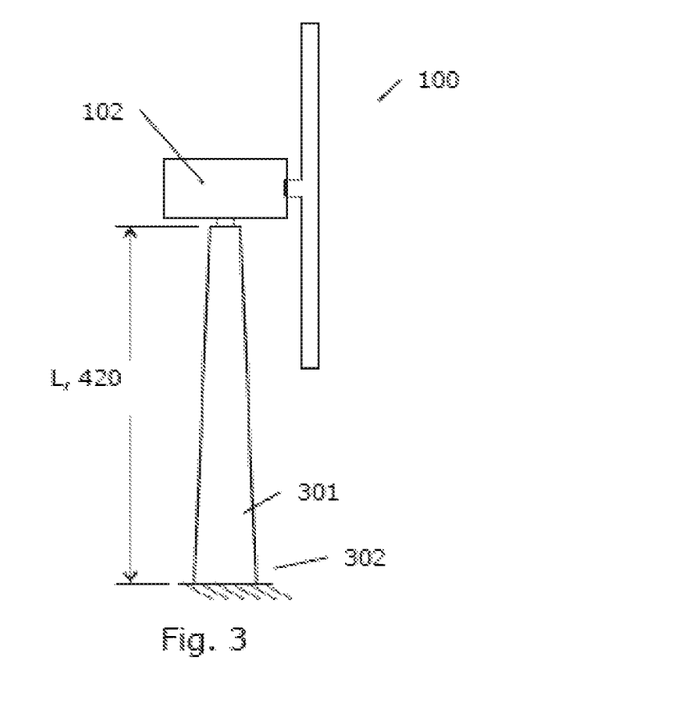
FIG. 3 is a sketch of a wind turbine modeled as a beam with a point mass at its free end.

FIG. 3 illustrates a sketch of a wind turbine. The tower 301 of the wind turbine 100 can be modeled as a beam which is fixed 302 in one end while a force or a torque is applied at the free end. On top of the beam (the free end) the nacelle 102 and the rotor can be modeled as a point mass. The movement of the tower sections can be described using the natural mode shapes of such a beam for example established by means of finite-element modeling and dynamic analyses.

Figure 4:
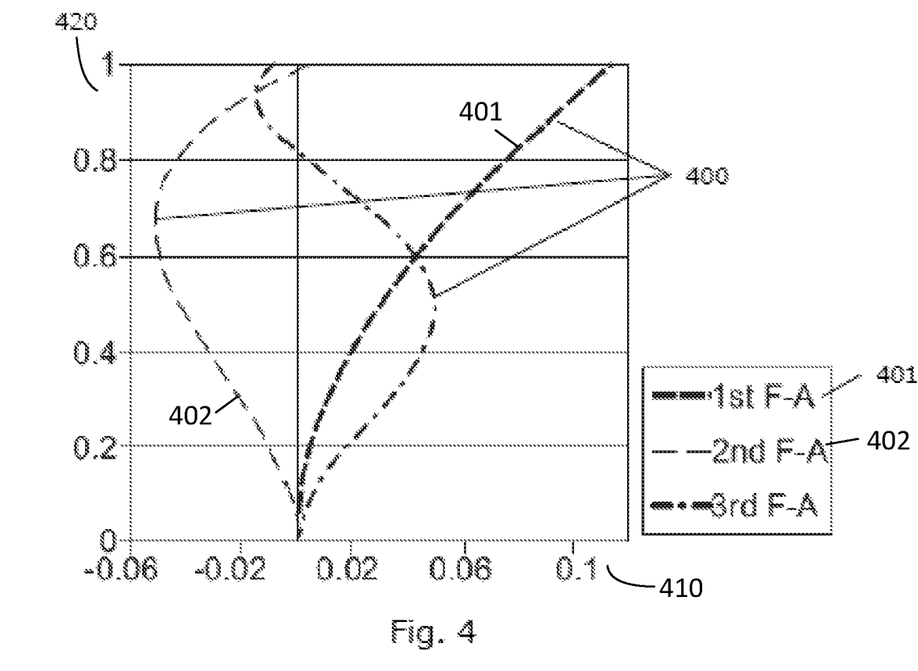
FIGS. 4 and 5 illustrate the first mode shapes in the fore-aft and side-side direction, respectively.

FIG. 4 illustrates the first three mode shapes 400 in the fore-aft direction where in particular the first mode 401 is dominating, driven by variations in the thrust force. In the figure is shown the modal displacement, 410, along the (normalised) tower height 420. The second mode, 402, reflects the mode with maximal displacement approximately halfway up the tower.

Figure 5:
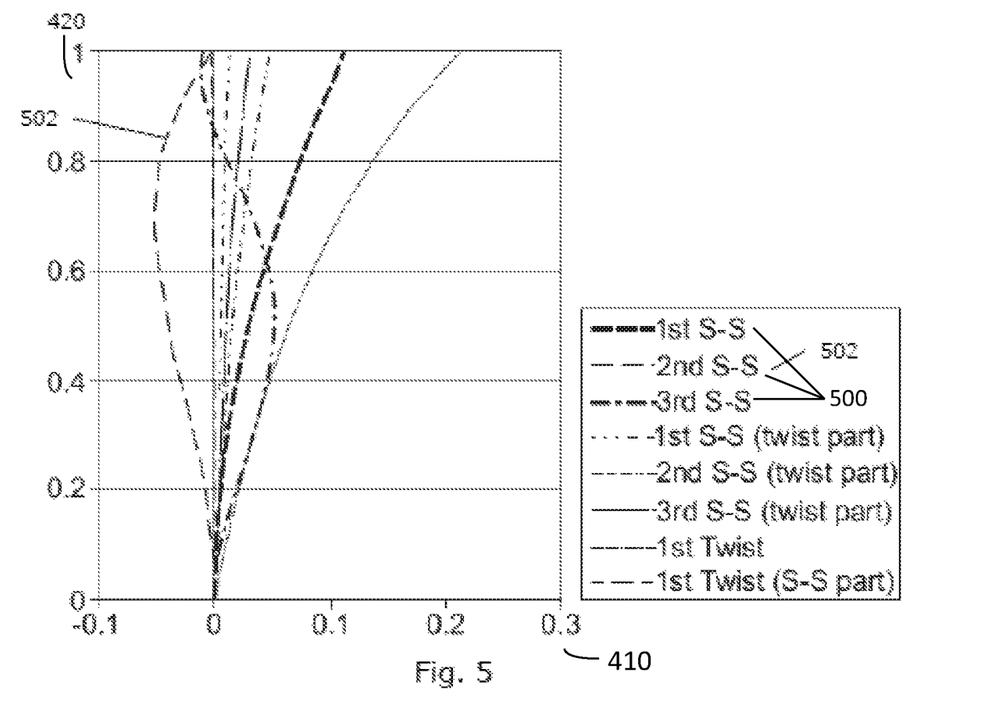

FIG. 5 illustrates the movements of the tower in the side-side direction, by the first three mode shapes 500 for side-side movements, together with the couplings to the twist of the tower. Variations in the wind turbine generator torque primarily drive the $2^{nd}$ side-side mode, 502.

By assuming that the tower only vibrates according to a finite number of mode shapes (as described above and shown in FIGS. 4 and 5), equations are setup relating the tower top position(s) and velocitie(s) to the pose of each of the accelerometers and again relating this to the acceleration components as measured. Such equations can be described on the following form:

$$x_k = f(x_{k-1}, u_k, k) + w_{k-1}$$

$$y_k = h(x_k, u_k, k)$$

$$\tilde{y}_k = y_k + v_k$$

Figure 7:
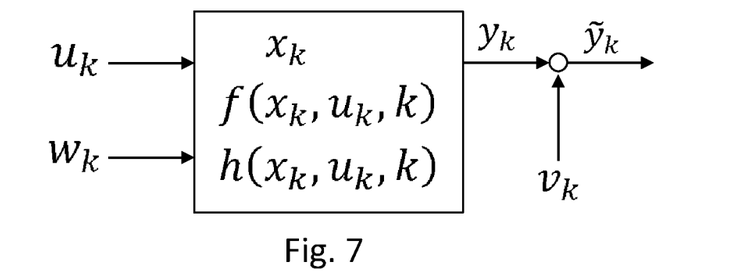
FIG. 7 illustrates a flow diagram showing relationship of parameters relating to the tower top position(s) and velocitie(s)

Which is further illustrated in FIG. 7, where:
k denotes a discrete point in time (with k−1 being the immediate past time point).
$u_k$ is a vector of inputs (here it can be thrust force and generator torque).
$x_k$ is a vector of the actual states (e.g. the pose of a node in the tower model).
$y_k$ is a vector of the actual process outputs (e.g. the actual acceleration components).
$\tilde{y}_k$ is a vector of the measured process outputs (e.g. the measured acceleration components).
$w_k$ and $v_k$ are process and output noise respectively. They are assumed to be zero mean Gaussian.
f(.) and h(.) are generic non-linear functions relating the past state, current input, and current time to the next state and current output respectively.

In an embodiment, the tower is described by its first fore-aft mode, $q_1$, and its first side-side mode, $q_2$. Each of the modes vibrates according to the equation of motion, i.e., $$\ddot{q}_1 m_1 + \dot{q}_1 c_1 + q_1 k_1 = F_1$$

$$\ddot{q}_2 m_2 + \dot{q}_2 c_2 + q_2 k_2 = F_2$$

where m, k, c and F are the modal mass, modal stiffness, modal damping, and the modal force, respectively. In this case, $$x = \begin{bmatrix} q_1 \\ q_2 \end{bmatrix}$$

$$u = \begin{bmatrix} F_1 \\ F_2 \end{bmatrix}$$

f(.) is given by the two equations of motion above. In case of a single 3-axis accelerometer measuring $Acc_1$, $Acc_2$, and $Acc_3$, $$y = \begin{bmatrix} Acc_1 \\ Acc_2 \\ Acc_3 \end{bmatrix}$$

and h(.) is the function that translates the two modal coordinates, $q_1$ and $q_2$ to the three measured components of the acceleration. h(.) is given by the geometry, i.e., how the accelerometer is located relative to the node for which the equations of motion are derived.

Figure 8:
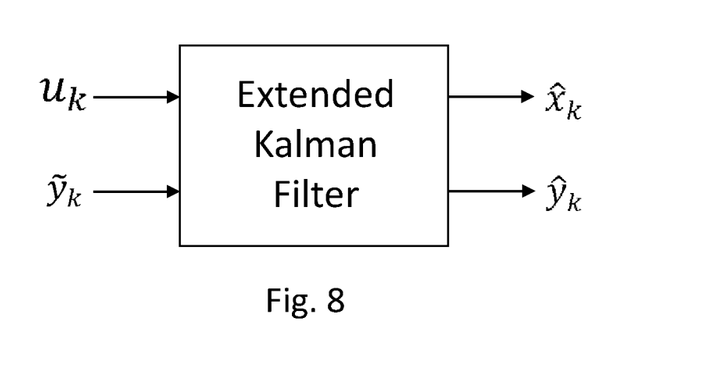
FIG. 8 shows an extended Kalman filter for estimated states.

Given the inputs, measured outputs and assumptions on the model and on the process and output noise, the purpose of an Extended Kalman Filter (EKF) is to estimate unmeasured states and the actual process outputs. This is shown below where the estimated states are $\hat{x}_k$ and $\hat{y}_k$ are the estimated measured outputs, as schematically shown in FIG. 8.

Figure 6:
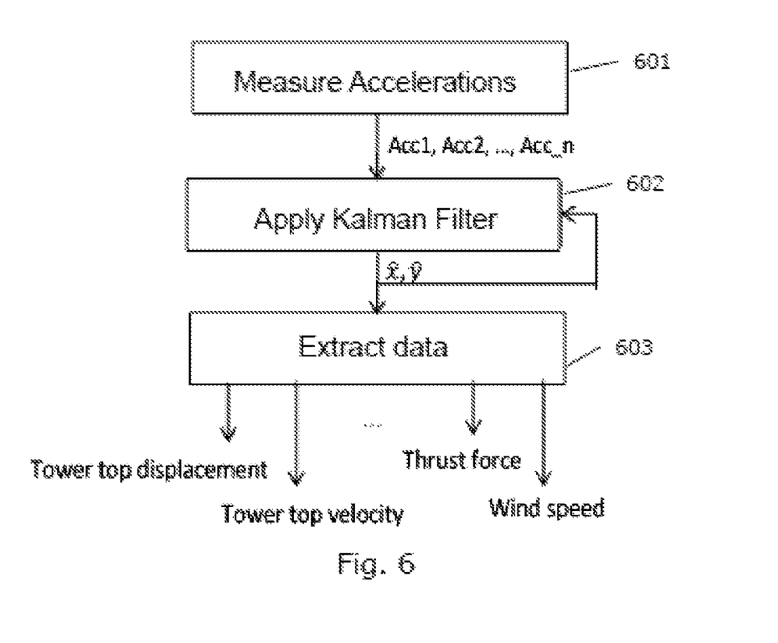
FIG. 6 is a flow chart illustrating an embodiment of the invention.

FIG. 6 is a flow chart illustrating an embodiment of the control method as described in the above and according to the invention. In a first step 601, the accelerations $Acc_1$, $Acc_2$, ..., $Acc_n$ are measured by the multi-axial accelerometers. By means of Kalman filtering, 602, the unmeasured states $\hat{x}_k$ and the actual measured process outputs $\hat{y}_k$ are estimated. Hereby, the absolute position and velocity of at least one of the accelerometers is determined, 603, and parameters such as the tower top displacement, tower top velocity, thrust force acting on the rotor can be determined.

The wind speed can then be estimated based on the determined thrust by:

$$F_T = \frac{1}{2} \cdot \rho \cdot A \cdot V^2 \cdot C_T$$

$$C_T = f(V, \theta, \omega)$$

$$V = \sqrt{\frac{2 \cdot F_T}{\rho \cdot A \cdot f(V, \theta, \omega)}}$$

where:
$F_T$=Estimated or Measured Thrust
$C_T$=Thrust Coefficient
P=Air Density
A=Rotor Area
V=Estimated Wind Speed
θ=Pitch Angle
ω=Rotor rotational speed While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

The invention claimed is:
1. A method of controlling a wind turbine, the wind turbine comprising a tower supporting a nacelle and a rotor with a number of pitch-adjustable rotor blades, the wind turbine further comprising a control system for changing the pitch of the rotor blades and/or the generator torque, and a plurality of multi-axial accelerometers mounted at different positions in the nacelle and/or in a top portion of the tower, each accelerometer being mounted in a defined orientation, the method comprising:
obtaining the position and orientation of each accelerometer as mounted;
measuring accelerations in at least two different directions by each accelerometer during operation of the wind turbine;
obtaining a number of pre-determined mode shapes for the movement of the wind turbine based at least on dimensions of the tower and a weight of the nacelle and the rotor as supported by the tower, the number of pre-determined mode shapes including at least one natural mode shape in a plane corresponding to fore-aft movements and at least one natural mode shape in a plane corresponding to side-side movements;
determining an absolute position of at least one of the accelerometers during operation of the wind turbine based on the measured accelerations, the mount position and orientation of each accelerometer and the pre-determined mode shapes;
determining a control parameter of the wind turbine as a function of the determined absolute position; and
controlling the wind turbine according to the control parameter.

2. The method of controlling according to claim 1 further comprising determining a velocity of at least one of the accelerometers during operation of the wind turbine based on the measured accelerations, the position and orientation of each accelerometer as mounted, and the mode shapes.

3. The method of controlling according to claim 1, wherein the number of pre-determined mode shapes of the wind turbine is determined from the natural mode shapes of a beam fixed in one end and with a point mass at an opposite free end.

4. The method of controlling according to claim 1, wherein the number of pre-determined mode shapes comprises at least the two first natural mode shapes in a plane corresponding to fore-aft movements of the wind turbine.

5. The method of controlling according to claim 1, wherein the number of mode shapes comprises at least the two first natural mode shapes in a plane corresponding to side-side movements of the wind turbine.

6. The method of controlling according to claim 1, further comprising estimating a thrust force acting on the rotor blades by the wind based on the determined absolute position of the at least one of the accelerometers during operation of the wind turbine.

7. The method of controlling according to claim 5 further comprising estimating a wind speed based on the estimated thrust and parameters including a rotational speed of the rotor blades, a pitch angle of each of the rotor blades, and an air density.

8. The method of controlling according to claim 1, wherein the absolute position of the accelerometer(s) is determined by means of a Kalman filtering.

9. The method of controlling according to claim 1, wherein the multi-axial accelerometers are each mounted with two axes of measurement arranged in an essentially horizontal plane.

10. The method of controlling according to claim 1, wherein at least two of the plurality of the multi-axial accelerometers are mounted such that the axes of measurement of the multi-axial accelerometers are oriented in the same directions.

11. The method of controlling according to claim 1, wherein at least two of the plurality of the multi-axial accelerometers are mounted such that the axes of measurement of the multi-axial accelerometers are oriented differently.

12. The method of controlling according to claim 1, wherein a first accelerometer is mounted at a first position in a first vertical plane parallel to an axis of rotation of the rotor blades of the wind turbine, and a second accelerometer is mounted at a second position in a second vertical plane parallel to the axis of rotation, the first plane being different from the second plane.

13. The method of controlling according to claim 1, wherein a first accelerometer is mounted at a first position at a first plane perpendicular to an axis of rotation of the rotor blades of the wind turbine, and a second accelerometer is mounted at a second position in a second plane perpendicular to the axis of rotation, the first plane being different from the second plane.

14. The method of controlling according to claim 1, where the control parameter comprises a pitch parameter of one or more of the rotor blades and the controlling of the wind turbine comprises pitching one or more of the blades according to the pitch parameter.

15. The method of controlling according to claim 1, where the control parameter comprises a torque parameter and the controlling of the wind turbine comprises adjusting the torque of a wind turbine generator according to the torque parameter.

16. A control system for a wind turbine comprising a tower supporting a nacelle and a rotor with a number of pitch-adjustable rotor blades, the wind turbine further comprising a plurality of multi-axial accelerometers mounted at different positions in the nacelle and/or in a top portion of the tower, each accelerometer being mounted in a defined orientation, the control system being configured to perform the steps of:
  obtaining the position and orientation of each of a plurality of multi-axial accelerometers as mounted;
  receiving data of the acceleration in at least two different directions as measured by each of the accelerometers during operation of the wind turbine;
  obtaining a number of pre-determined mode shapes for the movement of the wind turbine based at least on dimensions of the tower and a weight of the nacelle and rotor as supported by the tower, the number of pre-determined mode shapes including at least one natural mode shape in a plane corresponding to fore-aft movements and at least one natural mode shape in a plane corresponding to side-side movements;
  determining an absolute position of at least one of the accelerometers during operation of the wind turbine based on the measured accelerations, the mount position and orientation of each accelerometer and the pre-determined mode shapes;
  determining a control parameter of the wind turbine as a function of the determined absolute position; and
  controlling the wind turbine according to the control parameter.

17. A wind turbine comprising a tower supporting a nacelle and a rotor with a number of pitch-adjustable rotor blades, the wind turbine further comprising a plurality of multi-axial accelerometers mounted at different positions in the nacelle and/or in a top portion of the tower, each accelerometer being mounted in a defined orientation, and a control system according to claim 16.

18. A computer program configured when executed for controlling a processor to perform the method according to claim 1.

* * * * *